July 29, 1947.  E. J. ISBISTER ET AL  2,424,568
SELF-SYNCHRONOUS POSITIONAL CONTROL SYSTEM
Filed Nov. 17, 1939  3 Sheets-Sheet 2

INVENTORS
ERIC J. ISBISTER and
FRANCIS L. MOSELEY
BY Herbert H. Thompson
ATTORNEY

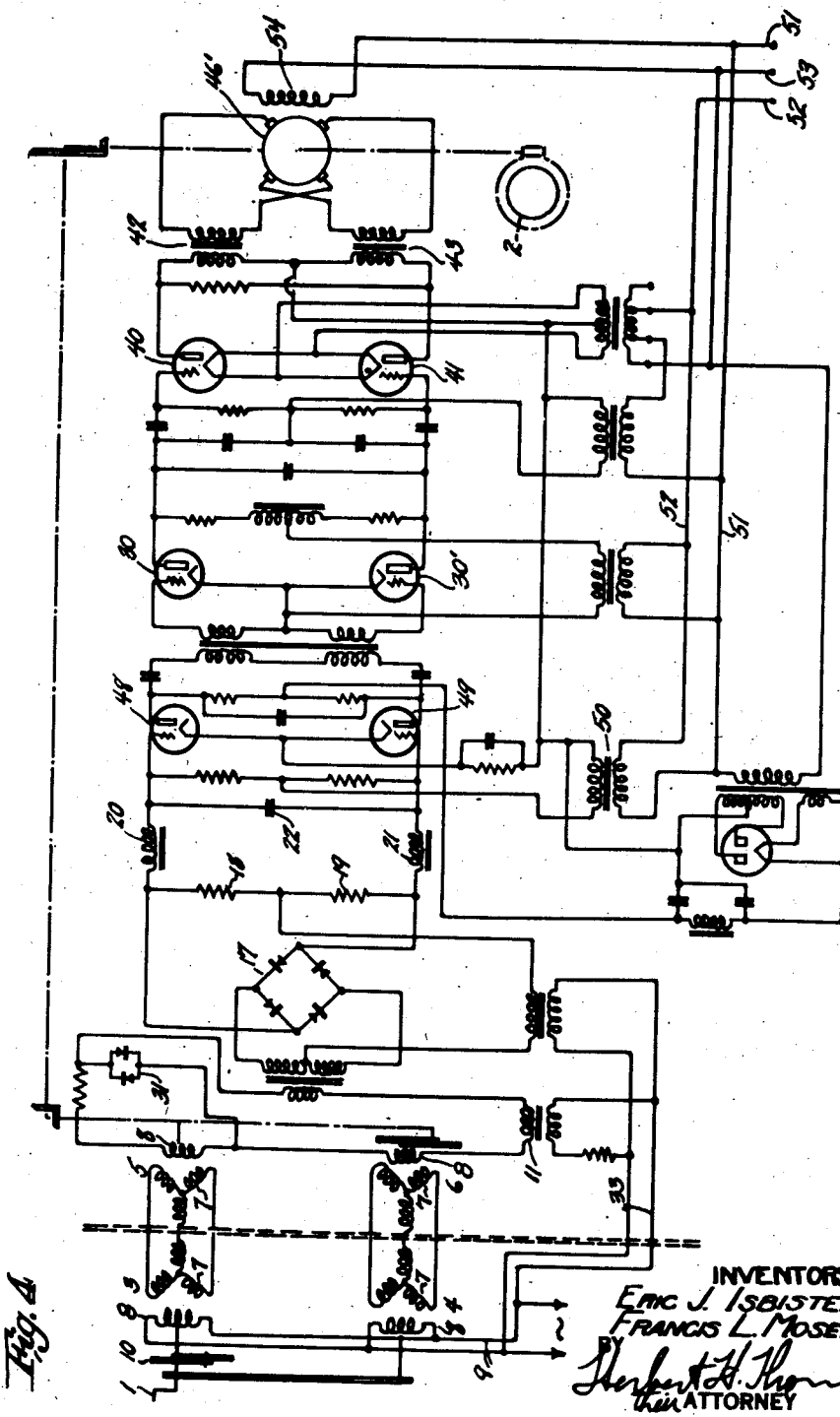

Patented July 29, 1947

2,424,568

UNITED STATES PATENT OFFICE 2,424,568

SELF-SYNCHRONOUS POSITIONAL CONTROL SYSTEM

Eric J. Isbister, Brooklyn, N. Y., and Francis L. Moseley, Chevy Chase, Md., assignors to Sperry Gyroscope Company, Inc., Brooklyn, N. Y., a corporation of New York

REISSUED
OCT 31 1950
RE 23290

Application November 17, 1939, Serial No. 304,895

12 Claims. (Cl. 172—239)

1

This invention relates generally to electrical control systems and the invention has reference, more particularly, to a novel electrical positional control system wherein a turnable controlling object is arranged to operate through suitable electrically operable means to cause a controlled object to turn in substantial synchronism with the controlling object, said electrically operable means employing a pair of signal voltage transmitters or synchronous generators operating in different speed ratios, i. e., a fine or high speed transmitter and a coarse or low speed transmitter, corresponding receivers being employed adjacent the controlled object and operating through a novel servo system for determining the motion of the controlled object.

To obtain great accuracy of reproduction by the controlled object of motion of the controlling object, i. e., substantial synchronism of the objects, it is necessary to employ a fine or high speed signal voltage transmitter and connected receiver arrangement. This high speed arrangement may operate in a ratio, for example, of 36:1 providing one channel of the synchro transmission system. The other channel of the transmission system is connected in a 1:1 ratio inasmuch as the objects may get out of step any amount from zero to 180° in either direction due, for example, to the turning of the controlling object such as a handwheel, when the system is not in operation.

The principal object of the present invention is to provide a novel position control system employing high and low speed transmitter-receiver arrangements and a remote servo system controlled therefrom for operating a controlled object in synchronism with the low speed transmitter, and wherein the power supply to the transmitter and receiver arrangements is independent of that provided for the remote servo system, whereby the servo system may be operated from a local source of A. C. supply.

Another object of the present invention is to provide a novel type of position control system wherein means is provided for eliminating 180° ambiguity of the controlled object with respect to the operation of the transmitter arrangement, i. e., means is provided for preventing the controlled object from coming to rest 180° out of phase with the controlling object.

A further object of the present invention is to provide a position control system employing modulator means for converting a reversible A. C. signal into a reversible D. C. signal, and for thereafter reconverting said reversible D. C. signal into

2 a reversible A. C. signal for use in controlling the servo system.

A further object of the present invention is to provide a novel positional control system wherein not only the displacement signal is used in controlling the controlled object, but also rate signals adapted to include velocity and acceleration are employed in conjunction with the displacement signal, thereby obtaining a highly refined system of control.

Other objects and advantages will become apparent from the specification, taken in connection with the accompanying drawings wherein the invention is embodied in concrete form.

In the drawings,

Fig. 1A illustrates a portion of the circuit of Fig. 1 somewhat modified.

Fig. 4 is a view similar to Fig. 1 but of a somewhat modified form of the invention.

Figure 1:
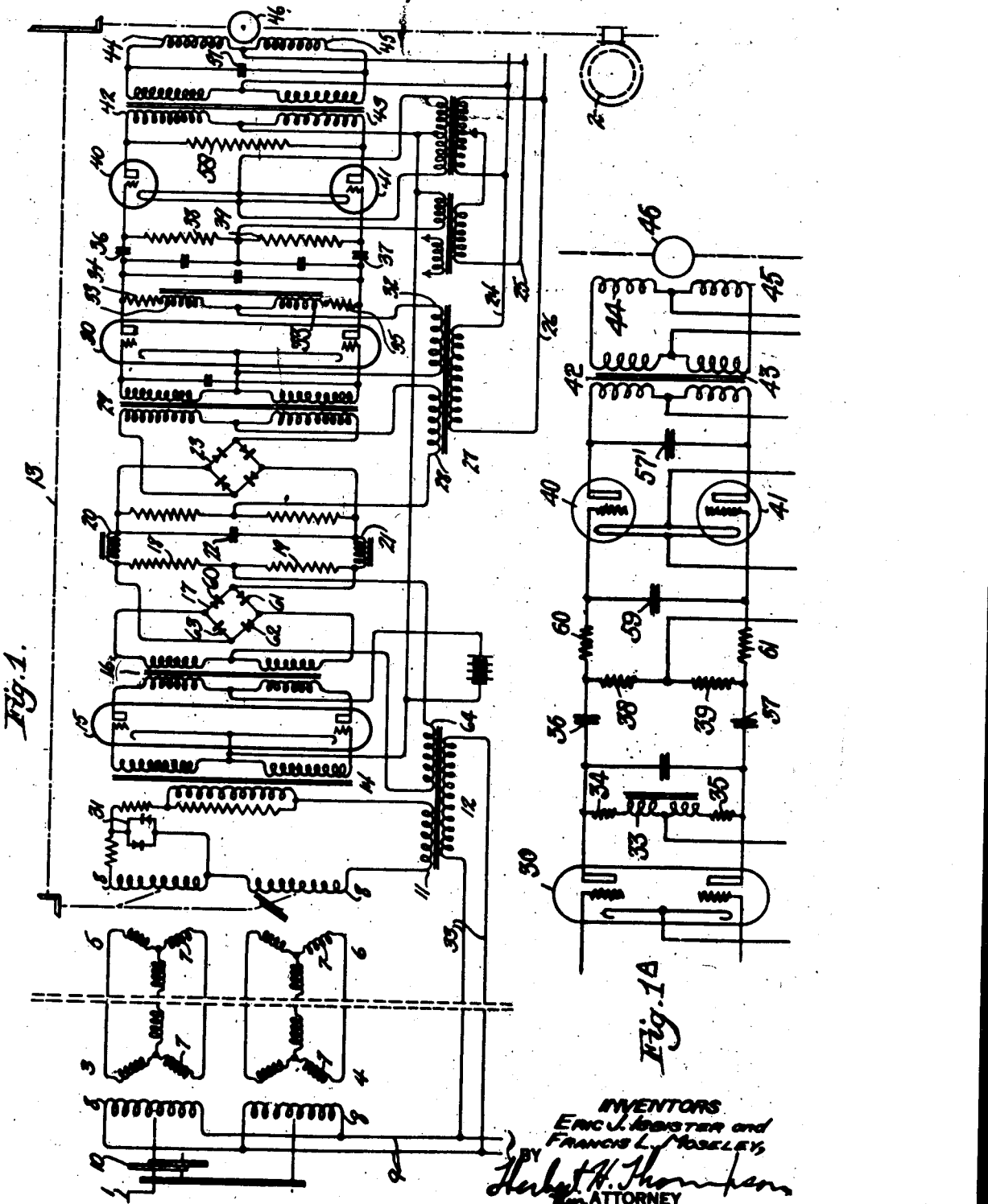
Fig. 1 is a wiring diagram illustrating a preferred form of the novel position control system of this invention.
Figure 2:
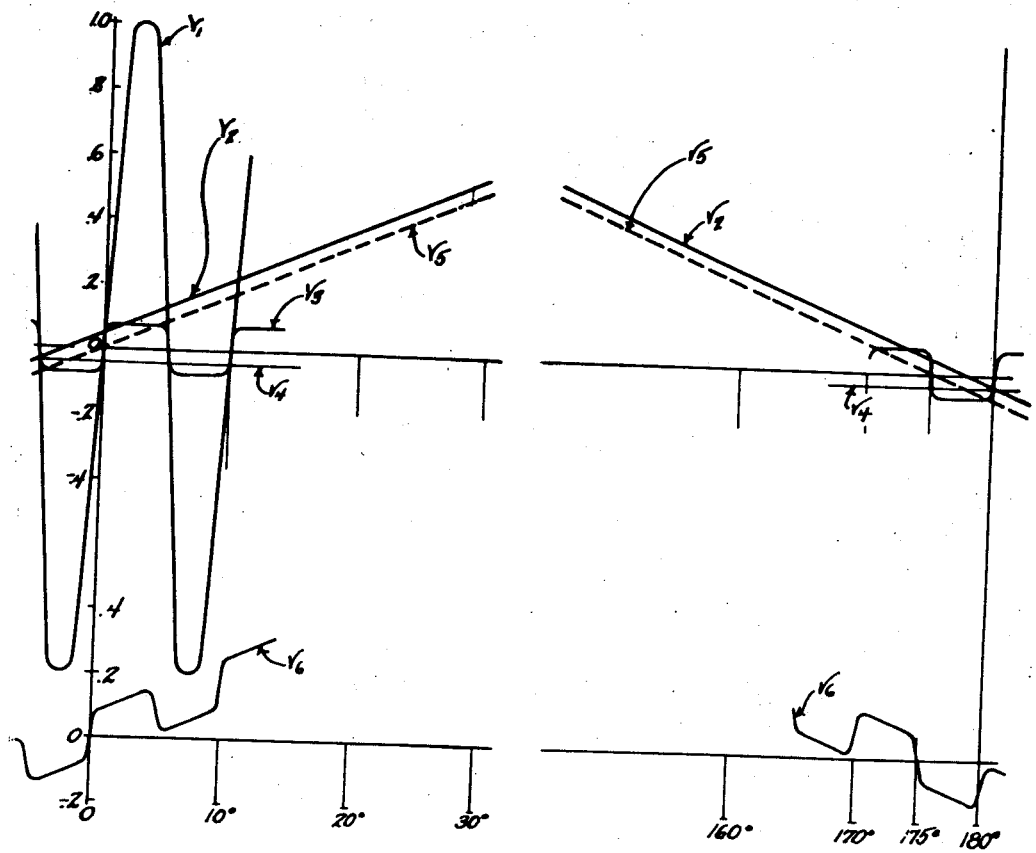
Fig. 2 is a diagram illustrating the potentials involved in the output of the transmitters of Fig. 1.
Figure 3:
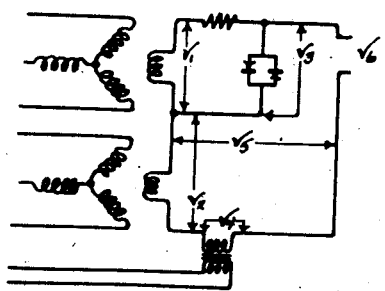
Fig. 3 is a detail view for use in explaining Fig. 2.

Referring now to Figs. 1 to 3 of the drawings, the controlling object 1 is illustrated as a handwheel, although the same might be any small power turned object, such as a telescope, the angular position of which is to be accurately and immediately repeated by the controlled object 2 which may be a ponderable turnable object.

The high and low speed transmitting devices 3 and 4, respectively, and their remote connected receiving devices 5 and 6, respectively, may be of any suitable type. Preferably, these devices are of the A. C. type in which the transmitting and receiving devices are similar in construction and are each provided with a poly-circuit armature winding and a single circuit field winding. In the drawings, these devices are each provided with a three-circuit armature winding 7 physically similar to a three-phase star connected armature winding. This armature winding may be mounted on the stator while the field winding 8 is on the rotor. In connecting each receiving device to its respective transmitting device, three conductors are used by means of which like points of the two armature windings 7 of the devices are interconnected.

The field windings 8 of the transmitter are connected to a suitable source of A. C. supply fed through the single phase leads 9, which supply may be from a local source, if desired. Field winding 8 of the high speed transmitter 3 is connected to handwheel 1 through reduction gearing 10, whereas field winding 8 of the low speed transmitter 4 is connected to turn at the same rate as the handwheel 1.

Transmitter field windings 8 produce in their respective armature windings 7 alternating magnetic fields having positions in space determined by the relative positions of windings 7 with respect to windings 8. Any rotation of the transmitter field windings or rotors 8 caused by angular movement of handwheel 1 produces a corresponding angular shifting of the axes of the magnetic fields of their respective armature windings resulting in a corresponding shifting of the fields of the armature windings 7 of the receivers 5 and 6, thereby tending to cause field windings 8 of the receivers to follow up such shift, but since these field windings are mechanically connected by the mechanical follow-up transmission 13 to the controlled object 2, alternating E. M. F.'s are induced in the field windings 8 of receivers 5 and 6, the values of which E. M. F.'s are substantially proportional to the angular displacement between the handwheel 1 and object 2, i. e., for small angular displacements.

The A. C. signal voltage induced in field winding 8 of the high speed of fine receiver 5 is limited by a voltage limiter 31 which is a non-linear resistor made up, for example, of selenium or copper oxide discs connected back to back so as to pass A. C. The use of this voltage limiter is disclosed in copending application, Ser. No. 41,851, wherein Francis L. Moseley, one of the present applicants, is the inventor. The limited voltage of the fine receiver 5 is added in the series with the signal voltage output of the low speed or coarse receiver 6 and with a fixed signal voltage supplied through the secondary winding 11 of a transformer 12 that is energized through leads 33 from supply 9. This summation voltage is supplied to the primary of a transformer 14 having a center-tapped secondary connected to supply the summation or combined signal and fixed voltages to the grids of a double triode amplifier 15 connected in push-pull. The output of the amplifier 15 is fed through its plate transformer 16 to a modulator 17 shown as of the ring type employing dry disk rectifiers which may be of the selenium oxide type. This modulator is also supplied with A. C. carrier voltage from transformer 12 which voltage, of course, passes through resistors 18 and 19 and through the divided secondary windings of the transformer 16.

As hereinafter more fully pointed out, the modulator 17 functions as a full wave rectifier. Assuming that the input signal, that is, the voltage supplied to the rectifier from the secondary of transformer 16 has a 60 cycle frequency and also that the carrier or reference voltage supplied to the modulator from secondary 64 of transformer 12 is of the same frequency, the output of modulator 17 will comprise components having frequencies corresponding to the sum and difference of the signal input and reference or carrier frequencies. Hence, the output components in the modulator will be of 120 cycles and zero cycles, the latter, of course, being the D. C. component. The 120-cycle component is readily suppressed or eliminated by the filter network with which the output of the modulator is connected, as described below.

The modulating carrier signal supplied from transformer 12 combines with the signal voltage supplied from tube 15 in the modulator 17 to produce a pulsating D. C. signal, the magnitude of which is proportional to the magnitude of the alternating current signal fed from tube 15 and the polarity of which reverses with reversals of phase of the A. C. signal. The 120 cycle pulsating component in the output of the modulator 17 and existing across the outer ends of resistors 18 and 19 is filtered out by the filter network consisting of inductances 20 and 21 and condenser 22. The ring type modulator 17 provides, of course, for full wave rectification of the amplified A. C. signal voltage output of tube 15, thereby providing a 120 cycle modulated voltage instead of 60 cycles. This is desirable because in a high performance control circuit such as this, only a little filtering can be tolerated as any appreciable time delay introduced by a filter would make the controlled object rough and unstable in operation. It is understood, however, that other types of modulators could be used such as push-pull triode vacuum tube modulators especially in slower acting controls.

The D. C. output applied across the terminals of condenser 22 is supplied to a second modulator 23 also shown as of the dry disc rectifier ring type modulator. The carrier A. C. for this rectifier 23 is supplied from the servo motor power circuit source; this being, for example, a local three-phase source having the three-phase leads 24, 25, and 26, leads 24 and 26 supplying a transformer 27, the secondary winding 28 of which supplies the modulator 23. The reversible D. C. signal input to modulator 23 combines with the carrier signal from winding 28 in the modulator 23 to produce an A. C. output across the primary of transformer 29, that is proportional to the magnitude of the controlling A. C. signal. The phase of this A. C. output applied to transformer 29 reverses when the phase of the controlling signal reverses, although these two signals may be of different frequencies. As the carrier of the second modulator, i. e., modulator 23, is related definitely to the servo circuit power source, the phase of the modulator output signal has the necessary and correct phase relation to the A. C. plate voltage of the double triode tube 30.

Tube 30 serves as an amplifier and also as a rectifier in that it draws current from secondary 32 through the impedance consisting of the choke coil 33 and resistors 34 and 35, the current from the secondary 32 dividing at the mid-tap of choke coil 33 so that part of this current flows through one-half of coil 33 and through resistor 34, whereas the remainder flows through the other half of coil 33 and resistor 35.

When the displacement signal is being amplified by tube 30, the currents flowing in the two halves of the choke coil 33 will be unequal because of the phase relations between the A. C. plate supply to tube 30 and the A. C. signal potential supplied to the grids thereof, i. e., when the signal potential is of one phase, one of the plate circuits of tube 30 draws a large current, whereas the other plate circuit of this tube draws a small current, and when the phase of the signal reverses due to reversed relative displacement of the objects, the larger current is transferred to the other half or plate circuit of tube 30.

Thus, an unbalanced D. C. component flows in choke coil 33 and in resistors 34 and 35, the magnitude of which depends on the relative displacement of the objects, and the direction or polarity of which depends on the direction of such relative displacement. The presence of this D. C.

component in choke coil 33, due to the resistance of its windings, causes a voltage drop across the choke coil and the same is true to a much larger extent of the resistors 34 and 35, the said total voltage drop being in phase with the displacement and proportional to the magnitude thereof. If this D. C. component varies, a voltage is induced across the choke coil 33, which induced voltage is in phase with the time rate of change of displacement, i. e., velocity, the first derivative of displacement with respect to time.

In this way, if the relative displacement of the objects, 1 and 2, is changing, two D. C. voltages appear across the outer ends of resistors 34 and 35, one proportional to and in phase with the relative displacement of the objects and the other proportional to and in phase with the relative velocity. In addition there exists an A. C. component across these resistors proportional to the displacement voltage.

The networks comprising condensers 36 and 37 and resistors 38 and 39 to which these voltages are applied take the derivative thereof provided these voltages are changing. Thus, if the relative displacement of the objects is not changing, neither of these voltages will be present and if the relative displacement is changing uniformly only one, the first derivative of displacement with respect to time, will appear but if the relative displacement of the objects is changing with acceleration or deceleration, both voltages will appear. This rate circuit is disclosed in the copending application of Francis L. Moseley et al., Ser. No. 11,424, filed March 16, 1935.

Condensers 36 and 37 cooperate with resistors 38 and 39 in applying displacement and rate voltages to the grids of grid control rectifier tubes 40 and 41, the output of which tubes pass through windings of the transformers 42 and 43 having their other winding connected in circuit with the windings 44 and 45 of the reversible capacity type induction servomotor 46.

In operation, as the handwheel 1 is turned, the outputs of the high speed or fine transmitter-receiver is combined with that of the low speed transmitter-receiver and with the fixed voltage from the transformer secondary winding 11 in the manner illustrated in Figs. 2 and 3. The voltages shown in Fig. 2 are the R. M. S. (meter) values of the various voltages and are applied against the angular position of the controlled object with respect to the controlling object. Voltages applied below the horizontal or X-axis are to be understood to be 180° out of time phase with those applied above this axis. If the summation voltage reverses its time phase, the controlled object reverses its direction of rotation.

Curve V₁ shows the open circuit voltage across the receiver rotor 8 of the 36:1 transmitter-receiver device. It will be seen that this voltage has a zero every 5°. The phase relations are such, however, that so far as this voltage alone is concerned, the controlled object will synchronize only at the even zero points, i. e., 0, 10, 20, etc., degrees.

Curve V₃ shows the open circuit voltage of the 36:1 receiver rotor 8 as limited by the voltage limiter 31. It will be noted that the peaks of the voltage curve V₁ are removed giving the flat-topped wave form shown as V₃. The voltage limiter 31 is so adjusted that the peak value of the limited signal is always less than the value of the 1:1 signal at ±5° from zero.

Curve V₂ shows the open circuit voltage of the 1:1 transmitter-receiver device. This curve has only two zero points per revolution of the controlled object and phase relations are such that the object is always driven to the zero degree point.

If the limited 36:1 and the 1:1 signals were combined and applied to the control of the object 2 then we would have only two synchronous points, namely, zero and 180°. It will be seen from the phase relations of the 36:1 signal that it tends to hold the controlled object on the 180° point as well as the zero degree point, and if the controlled object is within a few degrees of 180°, it would overpower the 1:1 signal and keep the object at the 180° point of synchronization. This 180° ambiguity is eliminated, however, in the present case by adding the fixed A. C. voltage supplied through transformer winding 11 in series with the 1:1 signal. This fixed additional voltage is designated V₄ in Figs. 2 and 3, and gives the 1:1 signal voltage a zero at zero degrees and at 175°, as shown in Fig. 2, and adds in the proper phase relation with the limited 36:1 signal to give only one point of synchronization for the controlled object, namely, the zero degree point. The zero signal point at 175° shown in Fig. 2, is an unstable zero, and our endeavor to hold the controlled object at this point is like trying to balance a needle on its point which is practically impossible since the controlled object tends to move from this point in a direction depending upon the resultant voltage.

The combined signal from the synchronizing circuit is amplified by the vacuum tube 15 and fed through its plate transformer 16 to the phase modulator 17 which converts this A. C. reversible amplified signal voltage to a reversible D. C. voltage. The carrier voltage supplied by transformer secondary winding 64 must be equal to or greater than one half the maximum value of the signal voltage output of transformer 16 in use. Assuming that the left-hand end of the secondary 64 of transformer 12, supplying the carrier signal to modulator 17, is positive for the moment, then current from this secondary flows through the upper half of the secondary of transformer 16, through rectifier 60 and resistor 19, back to winding 64. At the same time, current from winding 64 flows downwardly through the lower half of the secondary of transformer 16, through rectifier 62 and resistor 18, back to winding 64. At this time, no current flows through rectifiers 61 and 63.

As the carrier currents in the two resistors 18 and 19 are equal and flow in opposite directions, there is no net voltage across the outer ends of these resistors due to the carrier current. Assuming also that at the moment the left-hand end of transformer winding 64 is positive the handle 1 is being turned in such direction that the signal voltage from tube 15 makes the upper end of the secondary of transformer 16 positive, in that case the signal and carrier currents are additive in rectifier 60 and resistor 19. This signal current flows from resistor 19 through winding 64, back to the upper half of the secondary of transformer 16. Also, signal current from the lower half of the secondary winding 16 is subtractive from the carrier current in rectifier 62 and in resistor 18. Since the carrier current is larger than the signal current, the signal current from the lower half of the secondary of transformer 16 may be considered as flowing through winding 64, upwardly through resistor 18 and reversely through rectifier 62 back to the lower half of the secondary of transformer 16. In other words, this signal current is subtractive from the carrier current flowing upwardly through rectifier 62. Since the carrier and signal currents are additive in 19 and subtractive in 18, there is a net D. C. voltage across the outer ends of resistors 18 and 19, which voltage is proportional in magnitude to the signal voltage appearing across the secondary of transformer 16, the current flow through these resistors being such that the outer or lower end of resistor 19 is positive with respect to the outer or upper end of resistor 18.

During the next half cycle of the applied voltages when the left-hand end of winding 64 and the upper end of the secondary of transformer 16 become negative, the operation is similar, except that rectifiers 61 and 63 conduct current instead of rectifiers 60 and 62. Although the direction of the carrier current flow is reversed in the resistors 18 and 19, the direction of flow of the current due to the signal voltage is the same as in the previous half cycle, the lower end of resistor 19 remaining positive with respect to the upper end of resistor 18. This will be apparent when it is noted that the signal current from the upper half of the secondary of transformer 16 flows through winding 64, up through resistance 18, and through rectifier 63, back to the upper end of the secondary of transformer 16. Also, at this time current from the lower half of the secondary of winding 16 flows reversely through rectifier 61, i. e., is subtractive from the larger carrier current flow therethrough, flows up through resistor 19, and through winding 64, back to the secondary of transformer 16. Thus, it will be seen that the signal current flows upwardly in both resistors 18 and 19, showing that the lower end of resistor 19 has the higher potential just as in the previous half cycle. In other words, the carrier current merely operates as a switching means for causing the rectifiers to operate alternately in pairs to pass current as desired.

If the direction of the handwheel 1 is reversed, then in that case the output of the secondary of transformer 16 is reversed. Thus going back to the first example, when the left-hand end of winding 64 is positive, the upper end of the secondary transformer 16 will be negative and if the circuits are traced through, it can be shown that the resultant D. C. signal current flows downwardly through resistors 18 and 19, thereby making the upper outer end of resistor 18 positive with respect to the lower outer end of resistor 19, hence reversing the direction of operation of the motor 46.

The reversible D. C. voltage across resistors 18 and 19 is applied to the second modulator 23 which reconverts the reversible D. C. signal to a reversible phase A. C. signal for application to the grids of the rate amplifier tube 30, the output of which in combination with the rate circuit disclosed, controls the grid controlled rectifier tubes 40 and 41 to determine the operation of the capacity type or two phase induction motor 46 driving the controlled object 2. When tube 40 is passing current, transformer 42 is shorted, in effect, and winding 44 takes a current in phase with that of the supply 24—25, whereas winding 45, the current of which passes through condenser 57, takes a current substantially 90° leading that of leads 24—25, so that motor 46 operating as a two phase motor turns in one direction. On the other hand, when tube 41 is passing current, transformer 43 is shorted, in effect, causing winding 44 to take a leading current while winding 45 takes a current in phase with that of leads 24 and 25 causing motor 46 to turn in the reverse direction. The follow-back connection 13 serves to re-position the windings 8 to the null position when the objects are in synchronism.

If desired, condenser 57 can be replaced by a smaller condenser 57' shown in Fig. 1A, connecting the plates of tubes 40 and 41 in which case the transient eliminating resistance 58 may be left out since the condenser 57' also serves the function of this resistance. The operation is substantially the same, i. e., when tube 40 is passing current the secondary of transformer 42 is shorted in effect, and condenser 57' is connected across the secondary of transformer 43 so that this transformer takes a leading current causing motor winding 45 to also take a leading current.

Inasmuch as the condenser motor 46 in operating causes the plate voltage on the non-operating tube 40 or 41, as the case may be, to shift phase merely 90° as the motor operates in one direction or the other, it is desirable to employ a condenser 59 as shown in Fig. 1A connected across the grids of tubes 40, 41. In this case, the resistances 60 and 61 should be inserted between the grids of these tubes and condensers 36 and 37. This has the effect of placing condenser 59 and one of the resistances 60 or 61, as the case may be, in series with the grid of the non-operating tube thereby shifting this grid voltage to correspond with the shift in its plate voltage.

In the form of invention shown in Fig. 4, parts similar to those in Fig. 1, are similarly numbered. In this form of the invention, the apparatus is the same as that shown in Fig. 1, up to the second modulator, but in the present figure instead of using the dry disc rectifier ring type modulator for converting the reversible direct current signal to a reversible phase A. C. signal, a push-pull thermionic modulator is employed. This modulator consists of tubes 48 and 49 having their grid filament circuits supplied with A. C. from transformer 50 energized by leads 51 and 52 of the three-phase supply 51, 52, and 53, which supply may be a local supply, obtainable at the controlled object. The output of the phase modulator 17 is applied through the filter 20, 21 and 22 to the grids of modulator tubes 48, 49, the output of these tubes being supplied as in the case of modulator 23 of Fig. 1 to the rate taking tubes 30 and 30'. A reversible repulsion motor 46' is used in Fig. 4 in lieu of the split phase motor 46 of Fig. 1. The field winding 54 of this motor is connected to supply leads 51, 53, whereas the pairs of brushes of this motor are connected across windings of transformers 42 and 43. Field winding 54 induces A. C. potential in the rotor of motor 46' so that potentials appear across the brushes of this rotor which are applied to transformers 42 and 43. Thus, when the tube 49 is rendered conducting, the corresponding winding of transformer 42 is shorted, in effect, and motor 46 operates in one direction, whereas when the tube 41 is rendered conducting the corresponding winding of transformer 43 is shorted, in effect, and motor 46 operates in the opposite direction, the speed of operation of the motor depending upon the magnitude of the current flowing in the tube output circuit.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A position control system of the character described comprising, a plurality of objects arranged to move in synchronism, synchronizing means interconnecting said objects, said synchronizing means including an alternating current supply, means fed therefrom for setting up an alternating reversible phase potential responsive to the departure of the objects from synchronism, means for modulating said alternating potential to convert the same into a reversible direct current potential, a second source of alternating current supply, modulating means fed from said second source of supply connected for receiving said reversible direct current signal and for converting the same back into a reversible phase alternating current signal, thermionic means for receiving said alternating current signal, a servomotor mechanism controlled from said alternating current signal including a motor for driving said controlled object, and a follow-up connection from said servomotor mechanism to said alternating, reversible phase potential setting up means.

2. In a positional follow-up control wherein a reversible motor drives a system into angular correspondence with a synchro transmitter, a transmitter, a driven system controlled therefrom and including a reversible power motor, means for producing a reversible phase alternating current signal from relative displacement between the transmitter and the driven system, means for producing an alternating current carrier signal, means for combining said two signals and for converting the displacement signal into a reversible direct current signal, a thermionic tube circuit, means for impressing the direct current signal upon said thermionic tube circuit the output of which controls the speed and direction of rotation of the said reversible power motor, and a follow-up connection between said power motor and said displacement signal producing means.

3. A position control system of the character described comprising, a plurality of objects arranged to move in synchronism, synchronizing means interconnecting said objects, said synchronizing means including high speed and low speed transmitters and connected receiver arrangements for setting up alternating potentials responsive to the departure of said objects from synchronism, means for supplying an alternating potential, means connecting said last named means in series with the outputs of said high speed and low speed transmitter and connected receiver arrangements, thermionic means fed from said connecting means and responsive to the combined potentials carried thereby, motor means controlled from said thermionic means for causing said objects to return to synchronism, said added alternating potential serving to eliminate 180° embiguity of said controlled object with respect to said controlling object, and a follow-up connection between said motor means and said high and low speed receiver arrangements.

4. A position control system of the character described comprising, a plurality of objects arranged to move in synchronism, synchronizing means interconnecting said objects including a reversible motor for maintaining said objects in synchronism, said synchronizing means also including high speed and low speed transmitters and connected receiver arrangements for setting up alternating potentials responsive to the departure of said objects from synchronism, means for limiting the maximum potential output of said high speed transmitter-receiver arrangement, means for supplying an alternating potential signal of substantially constant value, means for combining said three signals, and means for impressing the resultant upon a thermionic tube circuit the output of which controls the speed and direction of rotation of said reversible motor.

5. In a position control control system, in combination, controlling and controlled objects, a motor for driving said controlled object, thermionic tube means for controlling said motor, high speed and low speed transmitters operated from said controlling object, high speed and low speed receivers electrically connected to said transmitters, said receivers being arranged to be electrically connected to said thermionic tube means to supply signal voltages thereto, a voltage limiter arranged for connection to said thermionic tube means and connected in the output of at least one of said receivers for limiting the signal voltage of the latter, means for adding an alternating current voltage in series with the outputs of said receivers to be supplied to said thermionic tube means, said added alternating current voltage serving to eliminate 180° ambiguity of said controlling and controlled objects, and a mechanical follow-up connection between said controlled object and said high and low speed receivers.

6. In a position control system, in combination, controlling and controlled objects, a motor for driving said controlled object, thermionic control means for said motor, high speed and low speed transmitters operated from said controlling object, high speed and low speed receivers electrically connected to said transmitters, means for limiting the output voltage of said high speed receiver, said receivers being arranged to be electrically connected to said thermionic control means to supply signal voltages thereto, means for adding an alternating current voltage in series with the outputs of said receivers to be supplied to said thermionic control means, and said added alternating current voltage serving to eliminate 180° ambiguity of said controlling and controlled objects, and a mechanical follow-up connection between said controlled object and said high and low speed receivers.

7. In a position control system, a transmitter-receiver arrangement for producing a reversible phase alternating current signal, a modulator and connected rectifier supplied from said arrangement and acting to convert the signal into a reversible direct current signal, a second modulator for re-converting said direct current signal back into a reversible phase alternating current signal, a servo system controlled from said last named signal, and a follow-up connection between said servo system and said transmitter-receiver arrangement.

8. In a positional follow up control wherein a reversible motor drives a system into angular correspondence with a synchro transmitter, a transmitter, a driven system, a reversible motor for driving said system, means for producing a reversible alternating current signal from relative displacement between the transmitter and the driven system, means for producing a fixed alternating current signal, means for combining said two signals, a modulator supplied with a version of said combined signals and acting to convert the same into a direct current signal, a second modulator for reconverting said direct current signal to a resultant alternating current signal, a thermionic tube circuit, means for impressing the resultant alternating current signal upon said thermionic tube circuit the output of which controls the speed and direction of rotation of the said reversible motor, and a follow-up connection between said motor and said signal producing means.

9. In a positional control system, controlling and controlled objects, transmitter-receiver means for producing a signal potential dependent upon relative movement of said objects, thermionic tube means for receiving said signal potential and including grid controlled rectifiers connected in phase opposition, a reversible motor controlled from said thermionic tube means and mechanically connected for driving the controlled object, transformers having their secondaries connected respectively in the plate circuits of said grid controlled rectifiers, said motor having phase windings connected respectively to the primary windings of said transformers, single phase supply leads connected respectively to the common point of said motor phase windings and to the common point of said transformer primaries, condenser means arranged to be selectively electrically connected to said phase windings dependent on which of said grid controlled rectifiers passes current, and a follow-up connection between said motor and said signal producing means.

10. A positional control system as defined in claim 9 wherein said condenser means is connected across the plates of said grid controlled rectifiers, and additional condenser means connected across the grids of said grid controlled rectifiers for correcting the phase relation of the plate-grid potentials of the non-operating rectifier.

11. A positional control system as defined in claim 8, wherein said thermionic tube circuit has means for deriving a rate signal from the displacement signal and means combining said rate signal with the displacement signal to produce a dead-beat control of said power motor.

12. In a positional control system, controlling and controlled objects, transmitter - receiver means for producing a signal potential dependent upon relative movement of said objects, push-pull thermionic tube means for receiving said signal potential, a pair of output transformers having primary windings connected to the outputs of said thermionic tube means, a reversible motor having stator windings connected in series with the secondary windings of said transformer means, said motor being connected for driving the controlled object, a single phase supply for said motor, said motor having a condenser connected across its series connected stator windings, said thermionic tube means serving to short one or the other of said transformer secondary windings, in effect, to thereby selectively connect one of said stator windings directly across said single phase supply and the other of said windings across said supply in series with said condenser, thereby effecting reversible operation of said motor, and a follow-up connection between said motor and said transmitter-receiver means.

ERIC J. ISBISTER.
FRANCIS L. MOSELEY.

REFERENCES CITED

The following references are of record in the file of this patent:

UNITED STATES PATENTS

| Number | Name | Date |
| --- | --- | --- |
| 2,376,359 | Hultin | May 22, 1945 |
| 2,223,666 | Harrison | Dec. 3, 1940 |
| 2,008,364 | Moseley | July 16, 1935 |
| 2,068,490 | Hull | Jan. 19, 1937 |